Feb. 19, 1957 L. W. ATCHISON 2,781,565
METHOD AND APPARATUS FOR MAKING BELLOWS
Filed March 20, 1952
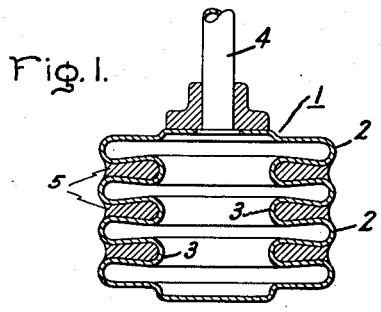
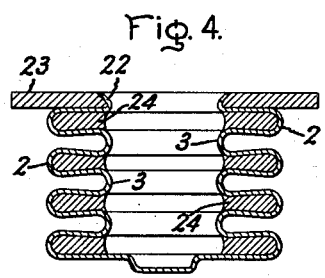
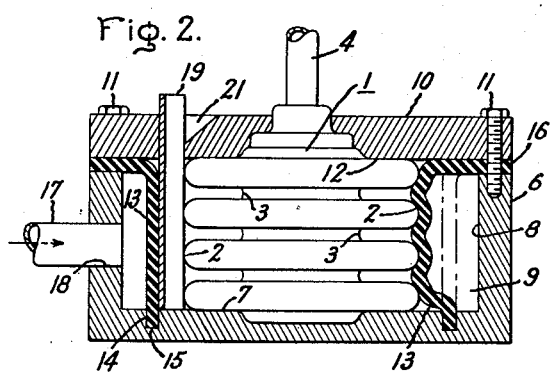
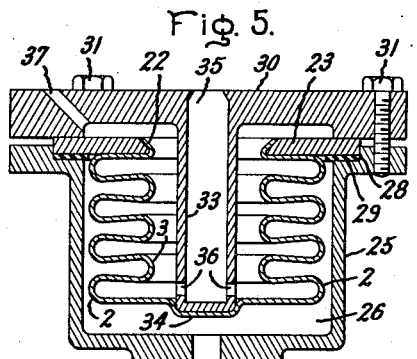
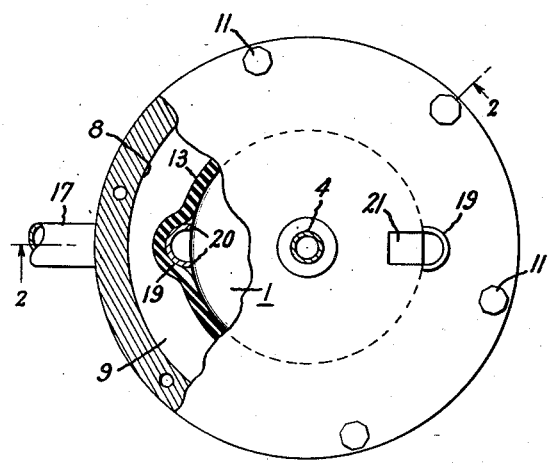
Inventor:
Leonard W. Atchison,
by
His Attorney.

United States Patent Office 2,781,565
Patented Feb. 19, 1957

2,781,565

METHOD AND APPARATUS FOR MAKING BELLOWS

Leonard W. Atchison, Erie, Pa., assignor to General Electric Company, a corporation of New York Application March 20, 1952, Serial No. 277,681

2 Claims. (Cl. 22—116)

My invention relates to flexible metal bellows of the type including a plurality of convolutions, and more particularly to such bellows including reinforcing rings and methods and apparatus for forming such rings.

This application is a continuation-in-part of my copending application Serial No. 764,286 filed July 29, 1947, now abandoned, and assigned to the assignee of the present invention.

Flexible bellows of the type including a plurality of successive convolutions are employed as the actuating elements of many types of control devices. In working with such bellows it is often difficult to obtain a degree of flexibility required for the proper operation of the control device without providing a bellows which is so weak that permanent deformation and loss of calibration may occur under extreme conditions which result in an over-stressing of the bellows. For example, bellows of this type are sometimes employed in controls for refrigerating apparatus wherein the bellows is actuated in accordance with temperatures below normal room temperature. When the refrigerating apparatus is shut down for an extended period, the resulting temperature will be considerably above that existing during normal operating conditions and the resulting increased pressure may result in an overstressing of the bellows. A bellows which has been overstressed by being subjected to this abnormal pressure loses its calibration and will not operate to control the apparatus in the manner intended. The overstressing of the bellows may result in a flattening of the convolutions of the bellows and hence in a permanent deformation of the bellows structure, rendering the bellows useless.

Accordingly, it is an object of my invention to provide a flexible bellows including an improved arrangement for preventing permanent deformation of the bellows.

It is another object of my invention to provide a flexible bellows including an improved arrangement for minimizing the necessity of recalibration of the bellows.

It is a further object of my invention to provide an improved method for forming reinforcing rings for the convolutions of the bellows.

It is another object of my invention to provide an improved apparatus for forming these reinforcing rings.

Further objects and advantages of my invention will become apparent as the following description proceeds and the features of novelty which characterize my invention will be pointed out with particularity in the claims annexed to and forming part of this specification.

In carrying out the objects of my invention, a predetermined pressure is applied to one side of the bellows and the longitudinal movement of the bellows under the influence of this pressure is limited. A low melting point alloy is then supplied to the other side of the bellows to fill the alternate convolutions. The alloy is then allowed to cool and solidify, thereby conforming to the shape assumed by these convolutions under the influence of the aforementioned pressure. Apparatus is provided for supplying the alloy to either the interior or exterior convolutions of the bellows.

For a better understanding of my invention, reference may be made to the accompanying drawing in which Fig. 1 is a sectional elevation view of a bellows illustrating one embodiment of my invention; Fig. 2 is a sectional elevation view of the apparatus employed to form the bellows of Fig. 1, this view being taken along the line 2—2 in Fig. 3, looking in the direction of the arrows; Fig. 3 is a top view, partly broken away, of the apparatus illustrated in Fig. 2; Fig. 4 is a sectional elevational view of a modified form of my invention; and Fig. 5 is a sectional elevational view of apparatus used to form the bellows construction illustrated in Fig. 4.

In Fig. 1, there is illustrated a form of my invention applied to a bellows which, as employed, may be subjected to an internal pressure exceeding the external pressure applied thereto. The flexible metallic bellows 1 illustrated in Fig. 1 includes a plurality of successive convolutions. Alternate convolutions 2 extend outwardly with respect to the axis of the bellows and the intermediate convolutions 3 extend inwardly toward the axis of the bellows. Such a bellows may be employed, for example, in controlling refrigerating apparatus, in which case the interior of the bellows may be placed in communication with a thermostatic bulb arranged to be influenced by the temperature of the evaporator of the refrigerating system. The interior of the bellows is adapted to be placed in communication with such a thermostatic bulb through a conduit 4. Under such conditions, as the temperature of the evaporator increases, the volatile fluid in the control system expands, the extent of the expansion depending on the extent of the increase in temperature. Conversely, upon decrease in temperature, the bellows contracts. The bellows for such an application is designed to operate within the normal range of evaporator temperatures which may extend, for example, from 20° F. to 35° F. However, when the refrigerating apparatus is shut down for a prolonged period, and particularly when the apparatus is shipped over long distances in summer weather, the temperature of the evaporator may rise substantially to the ambient temperature. This abnormally high temperature affects the thermostatic bulb and, through the communicating conduit 4, results in an abnormally high pressure being applied to the interior of the bellows. Under such conditions this pressure within the bellows may considerably overstress the bellows, resulting in a permanent deformation of the bellows and in a destruction of the calibration thereof.

In order to prevent such permanent deformation of this bellows, I provide rings 5 formed from a low melting point alloy within alternate convolutions of the bellows. Specifically, these rings 5 are cast within those convolutions whose closed ends have their convex sides facing the zone which may be subjected to the aforementioned abnormally high pressure, since the greatest danger of permanent deformation of the bellows lies in the possible flattening of the closed ends of the convolutions extending toward this zone of higher pressure. Thus in the form shown in Fig. 1 where the abnormally high pressure may be applied to the interior of the bellows, the rings 5 formed from the low melting point alloy are cast into the inwardly extending convolutions 3. The bellows is subjected to a predetermined internal pressure and the longitudinal expansion thereof is limited to a predetermined amount, so that the low melting point alloy solidifies and conforms to the shape assumed by the bellows under these predetermined conditions. Specifically the length of the bellows is limited to amount slightly less than the minimum length the bellows assumes during normal operating conditions, so that the cast rings assume a shape which does not interfere with the normal expansion and contraction of the bellows but which reinforces the bellows during the aforementioned abnormal conditions.

The manner in which the reinforcing rings 5 are formed and the apparatus for so forming these rings are illustrated in Figs. 2 and 3. The bellows 1 is there shown disposed within a mold chamber. This includes a mold 6 comprising a bottom or end wall 7 and a side wall 8. The chamber 9 formed by the mold 6 is of larger diameter or cross-sectional area than the bellows 1 so that the bellows is spaced from the side wall 8. The mold chamber 9 is closed by a cover 10 which is secured to the mold 6 by a plurality of bolts 11. The interior surface 12 of the cover 10 engages one end of the bellows 1 and the other end of the bellows engages the bottom wall 7. The distance between the cover and the bottom wall is chosen so that the amount of expansion of the bellows under the internal pressure applied is limited to slightly less than the minimum length reached during normal operation.

As mentioned above, in this form of my invention, the low melting point alloy is to be cast within the inwardly extending convolutions 3. The convolutions themselves provide a form for the alloy over substantially all the surface of the reinforcing rings. In order to provide a wall or mold for the alloy over the remaining surface, a flexible tubular diaphragm 13 is included between the bellows 1 and the side wall 8 of the mold chamber 9. The lower end 14 of this diaphragm 13 is received within a circular recess 15 formed in the bottom wall of the mold 6. The diaphragm may be merely pressed into the recess 15 or it may be permanently secured to the mold 6 in this region in any suitable manner. The upper end 16 of the diaphragm 13 is flanged outwardly and extends between the mold 6 and the cover 10 to provide a seal.

In order to urge the flexible diaphragm 13 against the exterior of the bellows, and in fact to urge the diaphragm partially into the convolutions 3, so as to minimize the possibility of the alloy extending along the exterior surface of the bellows between two successive outer convolutions 3, fluid under pressure is supplied to the chamber 9 between the side wall 8 of the mold and the flexible diaphragm 13. This fluid, which by way of example may be air at a predetermined pressure, is supplied through a conduit 17 extending through an opening 18 in the side wall of the mold. Leakage of fluid from the chamber 9 is prevented by the seal provided by the aforementioned flange 16 of the diaphragm 13. The diaphragm 13 may be formed of a material, such as silicone rubber, which is suitable for the aforementioned seal. This material is also able to withstand easily the relatively low temperature required for fluidity of the low melting point alloy employed. This alloy may be, for example, a matrix alloy including bismuth, lead, tin and antimony. A low melting point alloy is employed to prevent the temperature during the casting of the rings from rising above the melting point of any of these seals of the bellows.

In order to provide a passage for the alloy to the convolutions 3, two gates 19 are illustrated extending transversely of the convolutions of the bellows, that is parallel to the longitudinal axis of the bellows. These gates extend from the bottom wall 7 upwardly through openings in the cover 10. Each of the gates 19 is composed of an elongated member of arcuate cross-section, the open face of the member being disposed adjacent the exterior of the bellows. The edges 20 of the arcuate section are pressed into engagement with the exterior of the bellows by the flexible diaphragm 13 under the influence of the air pressure supplied to the chamber 9. The cover includes recesses or troughs 21 adjacent each of the gates 19 so that the alloy may be poured into the troughs 21 and will flow therefrom downwardly through the gates 19 and into the inwardly extending convolutions 3. The mold is maintained in its closed position and the pressure is maintained on the exterior of the flexible diaphragm 13 until the alloy has solidified. The pressure is then removed from the exterior of the diaphragm, allowing the diaphragm to assume the general position indicated by the dot-dash lines in Fig. 2 and the cover 10 is removed to permit removal of the bellows from the mold. To complete the operation, it is only necessary to remove the sprues formed at the gates 19.

In Figs. 4 and 5, there is shown a modified form of my invention in which the low melting point alloy is cast into the outwardly extending convolutions 2 and in which a modified form of apparatus is disclosed for effecting this casting within the interior of the bellows. The form of bellows shown in Fig. 4 is intended for use in situations where the pressure on the exterior of the bellows may substantially exceed that within the bellows and hence where it is necessary to reinforce the outwardly extending convolutions 2 to prevent deformation thereof. The bellows includes at its open end a lip 22 which is secured in any suitable manner, as by brazing, to the wall of an opening in a mounting plate 23.

In manufacturing the bellows of Fig. 4 in which reinforcing rings 24 are provided in the outwardly extending convolutions 2, it is necessary that the molten low melting point alloy be introduced into the interior of the bellows. The apparatus shown in Fig. 5 is adapted to effect the supply of alloy in a desired manner while at the same time maintaining the proper predetermined pressure on the bellows and limiting the longitudinal movement of the bellows to a desired amount. This apparatus includes a member 25 providing a chamber 26 for receiving the bellows. The member 25 is mounted on, or formed integral with, a hollow shaft 27 which is mounted for rotation by any suitable driving means, such as an electric motor (not shown), about an axis extending through the center of the hollow shaft and through the longitudinal axis of the bellows. The bellows is received within the chamber 26, and the mounting plate 23 thereof is supported within a recess 28 formed in the flanged upper wall of the member 25. A sealing gasket 29 is interposed between the plate 23 and the shoulder provided by the recess 28. The assembly is completed by a cover 30 which is secured to the member 25 by a plurality of bolts 31.

In order to form the rings 24 in the proper shape, a predetermined pressure is applied to the exterior of the bellows during the casting operation. This pressure may be provided by a fluid, such as air, introduced through the hollow portion or passage 32 of the shaft 27 and flowing into the chamber 26. As in the form previously described, the change in the length of the bellows, in this case the amount of contraction thereof, is limited to an amount just slightly shorter than the minimum length to be reached during normal operation. In order to effect this limitation in contraction of the bellows, the cover 30 includes a depending member 33 extending longitudinally of the bellows and adapted to engage the end 34 of the bellows.

The member 33 is made hollow to provide a passage 35 for the supply of molten low melting point alloy to the interior of the bellows. This member 33 further includes near its lower end a plurality of lateral passages or openings 36 through which the alloy is thrown from the passage 35 to the interior of the bellows and the convolutions 2 during the rotation of the assembly by the shaft 27. The cover 30 includes a plurality of outwardly inclined passages, one of which is shown at 37, for discharging any excess alloy into a suitable receptacle (not shown).

In making the bellows structure of Fig. 4 with the apparatus of Fig. 5, the bellows and its mounting plate 23 are first assembled within the chamber 26, the plate 23 being supported within the recess 28. The bellows is clamped in position and the chamber 26 sealed by bolting the cover 30 in position. The predetermined pressure is then applied to the exterior of the bellows by introducing a fluid under pressure into the chamber 26 through the passage 32 of the shaft 27. The compression of the bellows is limited by the depending member 33 which engages the closed end 34 of the bellows. The assembly is then rotated about the shaft 27 and molten low melting point alloy of the type employed in the previous form of the invention is introduced into the passage 35 of the member 33. This alloy is thrown outwardly through the openings 36 into the interior of the bellows and into the outwardly extending convolutions 2, filling these convolutions with alloy. Any excess alloy is discharged through the outwardly inclined passages 37 in the cover 30. While the assembly has been illustrated for rotation about a vertical axis, this axis may be tilted if desired, particularly if it is desired to minimize any bridging of alloy from one convolution 2 to the next successive convolution 2. Alternatively bridging can be minimized by vibrating the whole assembly axially while the alloy is in its molten condition. The pressure is maintained on the exterior of the bellows and the rotation of the assembly is continued until the alloy has cooled sufficiently to solidify. Rotation of the assembly is then discontinued and the pressure removed. The cover 30 is then removed and the completed bellows structure, with the properly formed reinforcing rings 24, is removed from the chamber 26.

While I have shown and described specific embodiments of my invention, I do not desire my invention to be limited to the particular constructions shown and described and I intend by the appended claims to cover all modifications within the spirit and scope of my invention.

What I claim as new and desire to secure by Letters Patent of the United States is:

1. The method of constructing a bellows which is used to separate a high pressure zone from a low pressure zone which zones are subject to a wide range of normal pressure differences which comprises forming a bellows with a plurality of alternately inwardly and outwardly facing annular convolutions each having a portion of curved transverse cross section, applying a predetermined abnormally high pressure to the side of said bellows which during use is normally subjected to said zone of higher pressure, limiting the longitudinal movement of said bellows under the influence of said predetermined abnormal pressure, supplying a low melting point alloy to the side of said bellows which during use is normally facing the low pressure zone and only into the spaces provided by said alternate convolutions, and allowing the alloy to cool and solidify while continuing to apply said abnormally high pressure and to limit said longitudinal movement, whereby said alloy conforms to the shape assumed by said alternate convolutions under the influence of said predetermined abnormal pressure and limited longitudinal movement conditions.

2. Apparatus for casting a low melting point alloy into the inwardly facing annular convolutions of a bellows which comprises a bellows, a mold having a bottom wall and a side wall for receiving the bellows with one end of said bellows engaging the bottom wall of said mold, a cover for closing said mold and engaging the other end of said bellows to limit longitudinal movement of said bellows, means for supplying a predetermined pressure to the interior of said bellows, a flexible tubular diaphragm between said bellows and said side wall of said mold, means for supplying pressure between said diaphragm and said side wall of said mold to urge said diaphragm against said bellows, and an elongated member of arcuate cross section between said diaphragm and said bellows and extending transversely of said convolutions, said member extending through said cover to provide a passage for supplying a low melting point alloy to said inwardly facing convolutions of said bellows.

References Cited in the file of this patent

UNITED STATES PATENTS

| | | |
|---|---|---|
| 1,356,217 | Novoting | Oct. 19, 1920 |
| 1,749,314 | Garkis | Mar. 4, 1930 |
| 1,778,893 | Forrester | Oct. 21, 1930 |
| 1,810,913 | Hawkins | June 23, 1931 |
| 1,813,880 | Kraft | July 7, 1931 |
| 1,840,651 | Bassler | Jan. 12, 1932 |
| 1,905,583 | Giesler | Apr. 25, 1933 |
| 1,998,666 | Frank | Apr. 23, 1935 |
| 2,003,119 | Newell | May 28, 1935 |
| 2,166,165 | Linderman | July 18, 1939 |
| 2,285,812 | Gay | June 9, 1942 |
| 2,368,295 | Goran | Jan. 30, 1945 |
| 2,373,680 | Hawley | Apr. 17, 1945 |
| 2,410,936 | Gronemeyer et al. | Nov. 12, 1946 |
| 2,414,285 | Harrison et al. | Jan. 21, 1947 |
| 2,472,754 | Mead | June 7, 1949 |
| 2,493,414 | Morrison | Jan. 3, 1950 |
| 2,513,101 | Olsen | June 27, 1950 |
| 2,517,902 | Luebkeman | Aug. 8, 1950 |
| 2,593,547 | Duerksen | Apr. 22, 1952 |
| 2,607,969 | Evans | Aug. 26, 1952 |
| 2,608,529 | Varian | Aug. 26, 1952 |
| 2,640,235 | Hazelett | June 2, 1953 |
| 2,660,770 | Davis | Dec. 1, 1953 |

FOREIGN PATENTS

| | | |
|---|---|---|
| 620,372 | Germany | Oct. 19, 1935 |